(12) United States Patent
Banks, III

(10) Patent No.: US 10,443,705 B1
(45) Date of Patent: Oct. 15, 2019

(54) DIFFERENTIAL COVER

(71) Applicant: Gale C. Banks, III, Bradbury, CA (US)

(72) Inventor: Gale C. Banks, III, Bradbury, CA (US)

( * ) Notice: Subject to any disclaimer, the term of this patent is extended or adjusted under 35 U.S.C. 154(b) by 0 days.

(21) Appl. No.: 16/167,995

(22) Filed: Oct. 23, 2018

(51) Int. Cl.
*F16H 57/04* (2010.01)
*F16H 57/037* (2012.01)
*F16H 48/38* (2012.01)

(52) U.S. Cl.
CPC ......... *F16H 57/0416* (2013.01); *F16H 48/38* (2013.01); *F16H 57/037* (2013.01); *F16H 57/0417* (2013.01)

(58) Field of Classification Search
CPC .................. F16H 57/0415; F16H 57/0416
See application file for complete search history.

(56) References Cited

U.S. PATENT DOCUMENTS

| | | | | |
|---|---|---|---|---|
| 5,839,327 A | * | 11/1998 | Gage ................... | F16H 57/0412 74/607 |
| 5,927,384 A | * | 7/1999 | Waldner, Jr. ........... | B60K 17/16 165/121 |
| 6,155,135 A | * | 12/2000 | Gage ................... | F16H 57/0416 165/47 |
| 8,715,127 B2 | * | 5/2014 | Beutler ................. | B60B 35/163 475/161 |
| 2005/0126749 A1 | * | 6/2005 | Matti .................. | F16H 57/0412 165/41 |

* cited by examiner

*Primary Examiner* — Tisha D Lewis
(74) *Attorney, Agent, or Firm* — Karish & Bjorgum, PC

(57) ABSTRACT

A vehicle differential cover with cooling fins. The differential cover including an area closing the differential lubricant sump. Air scoops are outwardly of the differential and the curved surfaces at the downstream edges of the air scopes direct flow to the cooling fins extending over the area of the cover plate closing the differential lubricant sump. A baffle selectively closes the scoops.

14 Claims, 6 Drawing Sheets

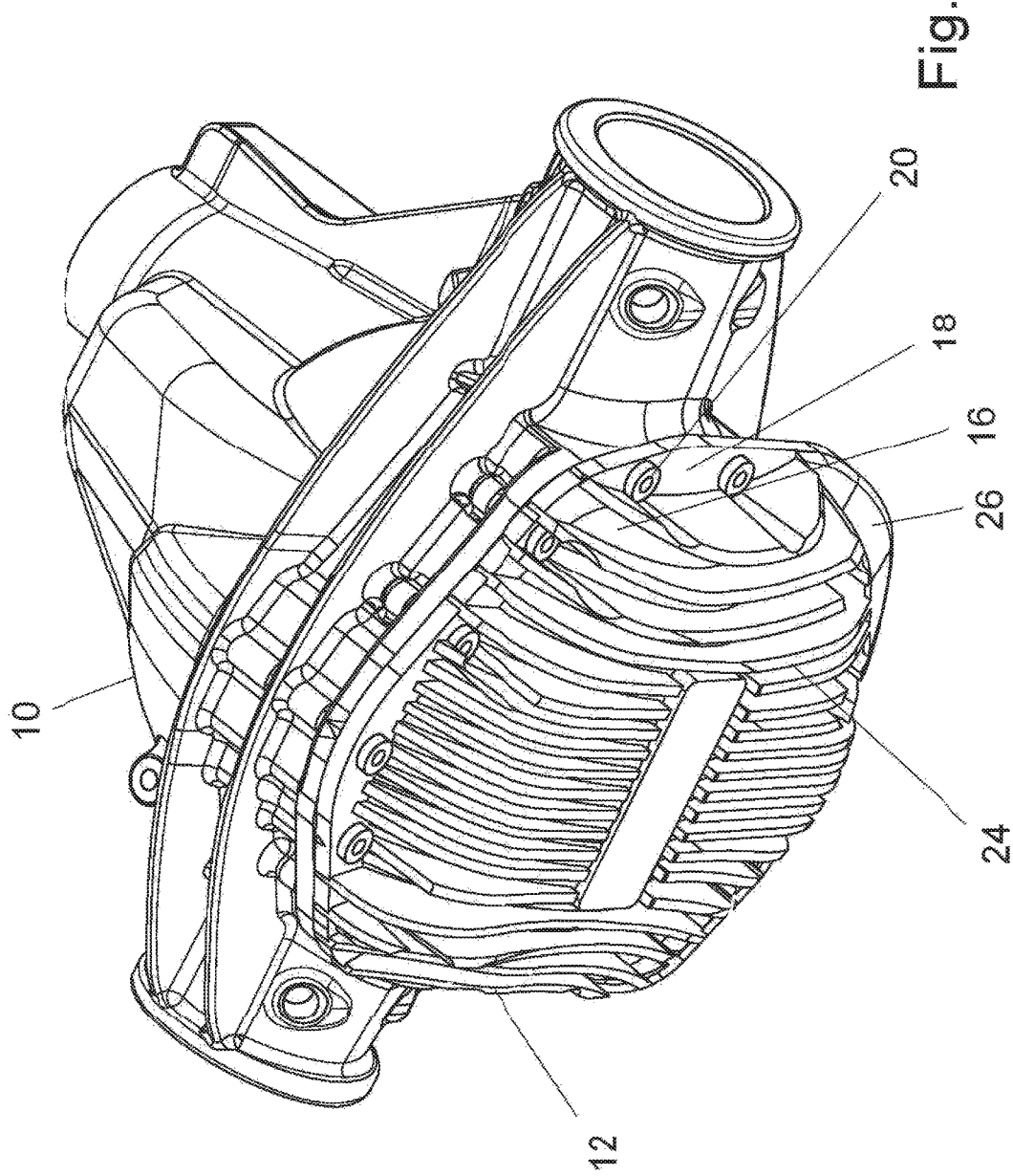

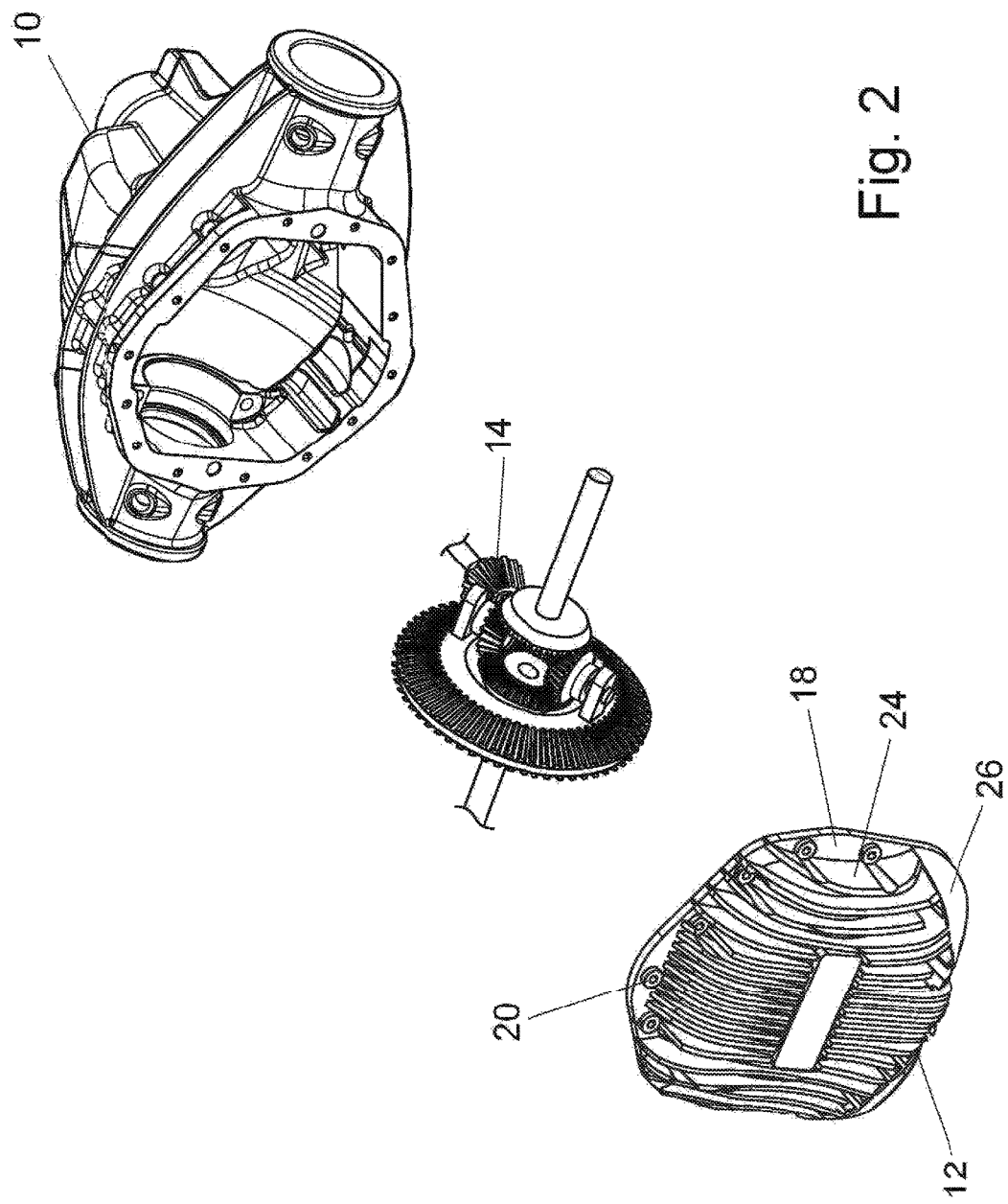

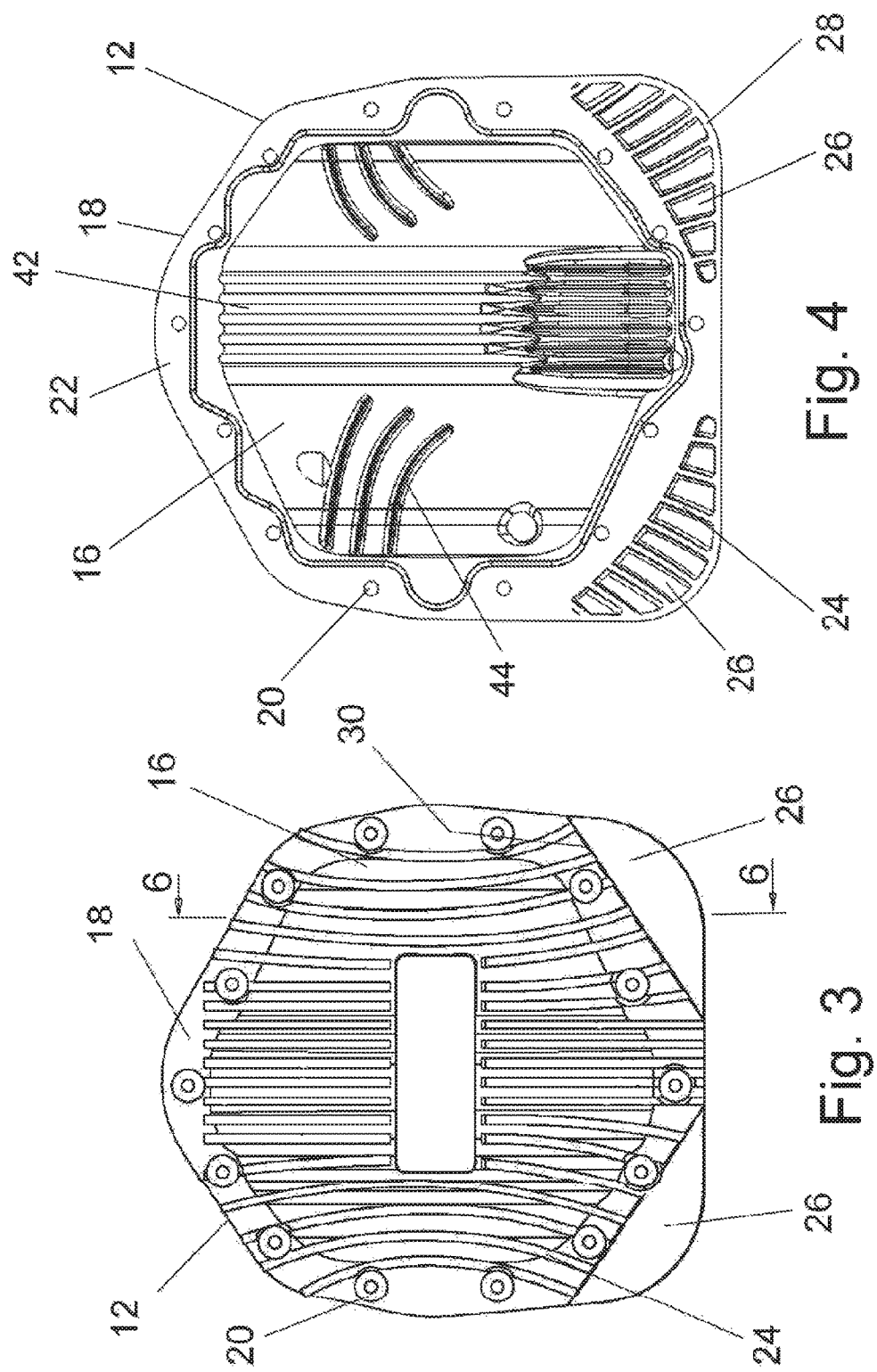

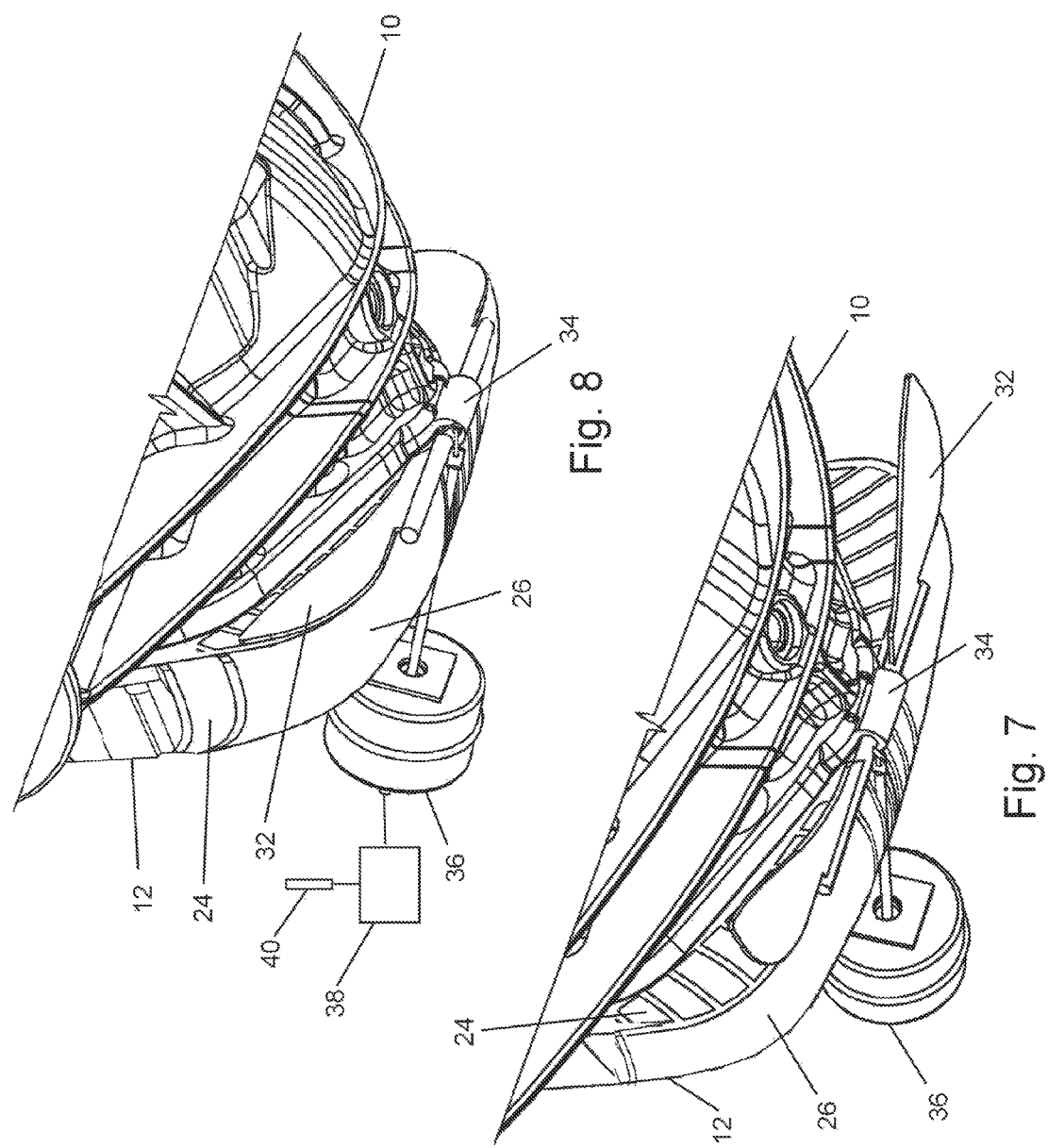

DIFFERENTIAL COVER

BACKGROUND OF THE INVENTION

The field of the present invention is vehicle differentials.

Drive train differentials frequently include a roughly conically-shaped case with a rear cover bolted thereto. The lower portion of the case conveniently defines a differential lubricant sump. The cover closes the case cavity including the lubricant sump portion and is frequently adorned with cooling fins which increase the surface area for increased heat radiation and conduction into the ambient air. Such differential covers are so adorned because temperatures within the differential can increase because of friction and fluid mixing effects to a level injurious to the included lubricant, seals and the like.

Recent testing of differentials under substantial sustained load suggests that differential lubricant can reach temperatures sufficient to degrade lubricant performance, even with cooling fins. One area where fins are easily fabricated into the component is the differential covers. Even with such fins, differential lubricant temperature can reach temperature that can degrade performance.

SUMMARY OF THE INVENTION

The present invention is directed to differential covers for vehicles which include an aerodynamic effect. A differential cover includes a cover plate attachable to the differential at a mounting periphery on the cover plate, cooling fins on the cover plate and at least one air scoop. The cooling fins extend over an area of the cover plate closing the differential lubricant sump. Each air scoop is displaced from the second side of the cover plate and extends from outwardly of the mounting periphery of the cover plate to direct air inwardly. The air scoops direct air flow to the cooling fins over the area of the cover plate closing the differential lubricant sump.

In a preferred embodiment, portions of the cooling fins extend outwardly of the mounting periphery on the cover plate. The portions of the cooling fins which extend outwardly of the mounting periphery have air scoop coverings defining the air scoops. Multiple scoops may be employed; and such scoops are curved to extend from outwardly of the mounting periphery of the cover plate to inwardly across the cover plate, thereby receiving air flowing past the differential and directing that air across the cooling fins.

Vehicles can experience great temperature extremes in operation. An air scoop baffle may be employed to regulate the flow of air to the air scoop or scoops to control the cooling effect. Regulation may either be in a binary fashion or with modulation. The baffle may also be controlled in a complex scenario to allow for early reduced cooling during vehicle start-up and later increased cooling with demand.

Accordingly, it is a principal object of the present invention to provide improved thermal conditions for vehicle differentials. Other and further objects and advantages will appear hereinafter.

BRIEF DESCRIPTION OF THE DRAWINGS

FIG. 1 is an isometric view of a differential with a cover plate;

FIG. 2 is an exploded assembly view of the differential with the cover plate;

FIG. 3 is a plan view of the outside of the cover plate;

FIG. 4 is a plan view of the inside of the cover plate;

FIG. 7 is an isometric detail view of a baffle associated with the cover plate in an open position.

FIG. 8 is an isometric detail view of a baffle associated with the cover plate in a closed position.

DETAILED DESCRIPTION OF THE PREFERRED EMBODIMENT

Figure 6:
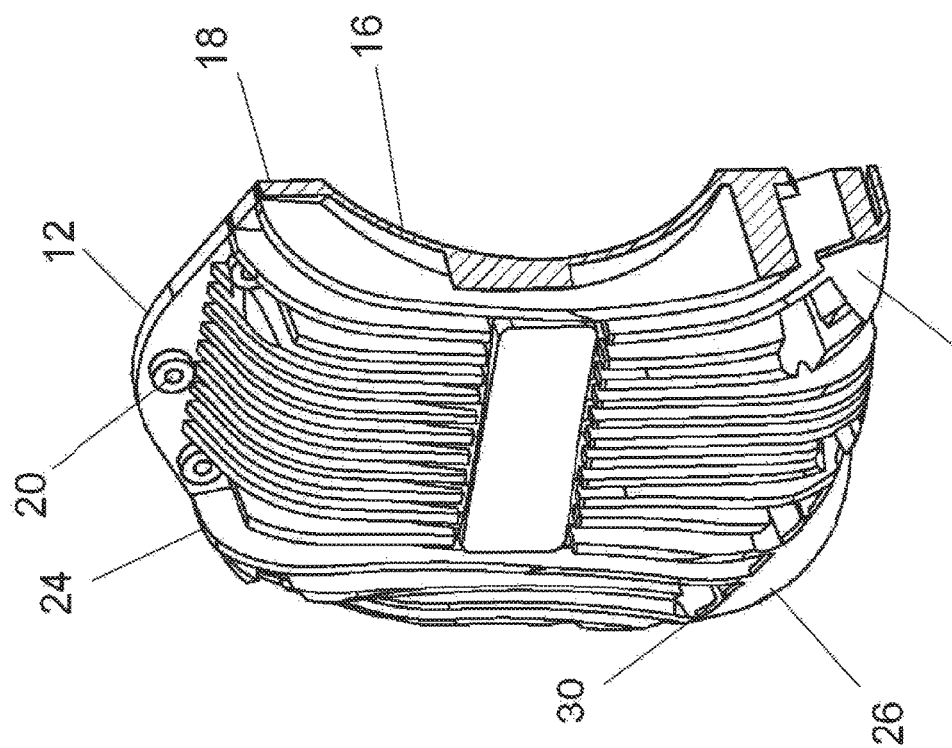
FIG. 6 is an isometric section view of the cover plate taken along line 6-6 of FIG. 3.

Turning in detail to the figures, a vehicle differential 10 is illustrated in FIG. 1. A vehicle differential cover 12 is placed in sealing engagement with the differential 10. In FIG. 2, the components are exploded to show a differential mechanism 14. Differential lubricant partially fills the differential case. Therefore, the lower part of the case defines a lubricant sump. The ring gear of the differential mechanism extends into the sump portion of the case to lift lubricant for distribution throughout the differential case. Bolts (not shown) engage the differential cover 12 to the vehicle differential 10 to be sealably engaged for the containment of lubrication fluids and the exclusion of foreign matter.

The vehicle differential cover 12 is shown to be an integral aluminum casting. The components of this casting include a cover plate 16 which is dished to accommodate the differential mechanism 14. The cover plate includes an area closing the differential lubricant sump located at the lower portion of the differential case. A mounting periphery 18 extends fully about the cover plate 16 for sealable attachment to the differential 10. Mounting holes 20 extend through the mounting periphery 18 for engagement with the differential 10. The sealing surface of the mounting periphery 18 can be seen in FIG. 4. Typically, a gasket or other sealing means is accommodated between this surface 22 and a mating surface on the differential 10.

Figure 5:
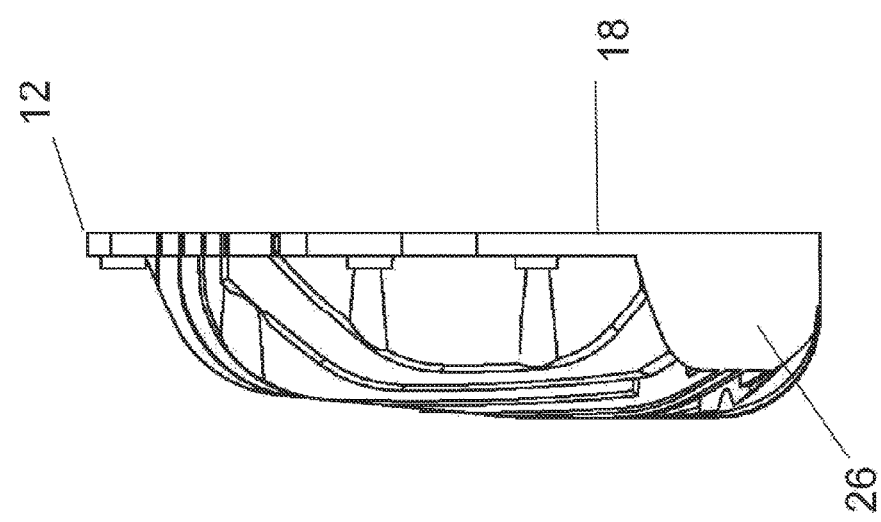
FIG. 5 is an edge view of the cover plate.

The vehicle differential cover 12 further includes cooling fins 24 integrally formed therewith. The cooling fins 24 are on the opposite side of the cover plate 16 from the sealing surface 22. The arrangement of these cooling fins 24 is shown to be a slightly splayed vertically-extending pattern. As can be seen in FIG. 5, the fins are curved about their lower ends to terminate at the plane of the mounting periphery 18.

As is particularly apparent in FIGS. 4 and 6, some of the cooling fins 24 in the illustrated embodiment extend outwardly of the mounting periphery 18 of the cover plate 16. In doing so, these cooling fins 24 extend into the air stream flowing past the differential 10. In the preferred embodiment, these extended fins 24 are to either side of the symmetrical vertical centerline of the vehicle differential cover 12 to extend the horizontal bottom line of the differential cover 12. In this area, the air flow about the differential 10 is less likely to be impeded by other vehicle components forwardly of the differential 10.

Scoops 26 are arranged to extend over the portions of the cooling fins 24 that extend outwardly of the mounting periphery 18. These scoops 26 are displaced from the cover plate 16 to define passageways between fins 24. A first edge 28 of each scoop 26 may be aligned with the plane of the mounting periphery 18. If desired because of airflow considerations around the differential, the first edge 28 of each scoop 26 may extend past the plane of the mounting periphery 18 and can even be flared to increase the frontal area of each scoop.

The scoops 26 are approximately perpendicular to the vehicle differential cover 12 at the mounting periphery 18. They extend in a curved manner following the outer surfaces of the cooling fins 24 inwardly of the mounting periphery to a second edge 30 lying approximately parallel to the plane of the mounting periphery 18 and displaced from the cover plate 16. These scoops 26 are dished for air to flow smoothly from the first edge 28 to the second edge 30 between the adjacent cooling fins 24 to direct air behind the differential cover 12 as the assembly moves forward as part of a moving vehicle. A configuration also contemplated which allows some flow conditioning in the scoop 26 is to terminate the cooling fins inwardly of the mounting periphery 18 so that a portion of the scoop area is clear of fins or other disruption.

The scoops 26, whether or not cooling fins extend outwardly of the mounting periphery 18 under the scoops 26, are located such that the curved surfaces at the downstream edge direct flow to the cooling fins extending over the area of the cover plate closing the differential lubricant sump. As the sump contains a pool of liquid, greater heat transfer can occur from the liquid in this area.

FIGS. 7 and 8 illustrate an articulated baffle 32. The baffle 32 is pivotally mounted through a pivot 34 fixed to the differential cover 12 to rotate relative thereto to selectively cover the cooling fins 24 extend outwardly of the mounting periphery 18 of the cover plate 16. In cooperation with the scoops 26, air flow to the fins 24 from forwardly of the differential 10 can be greatly restricted or terminated to reduce cooling.

A baffle control system is preferably employed to control the baffle 32. The baffle 32 is spring biased to either the fully open or fully closed position. An actuator 36, which conveniently mounts the spring, then actively works against the spring bias to articulate the baffle 32. In the present embodiment, the baffle is biased toward the closed position and the actuator 36 is to be energized to open the baffle 32. This actuator 36 may be a pneumatic piston actuated by either increased pressure over or reduced pressure below ambient. A solenoid or step motor may alternatively be used. The control may be binary or modulated.

A controller 38 is used to energize the actuator 36. The controller may be a simple thermostat or a CPU, either of which is configured to be responsive to temperature input. Other inputs such as elapsed time, engine start-up and drive initiation may also be used to follow a profile of operation. Input may be independently initiated or be part of the engine control system. A temperature sensor 40 is used to generate temperature input. The sensor 40 may be located in ambient conditions or in differential lubricant within the differential 10. It is even possible to create a complex profile of operation based on multiple temperatures and time.

Figure 10:
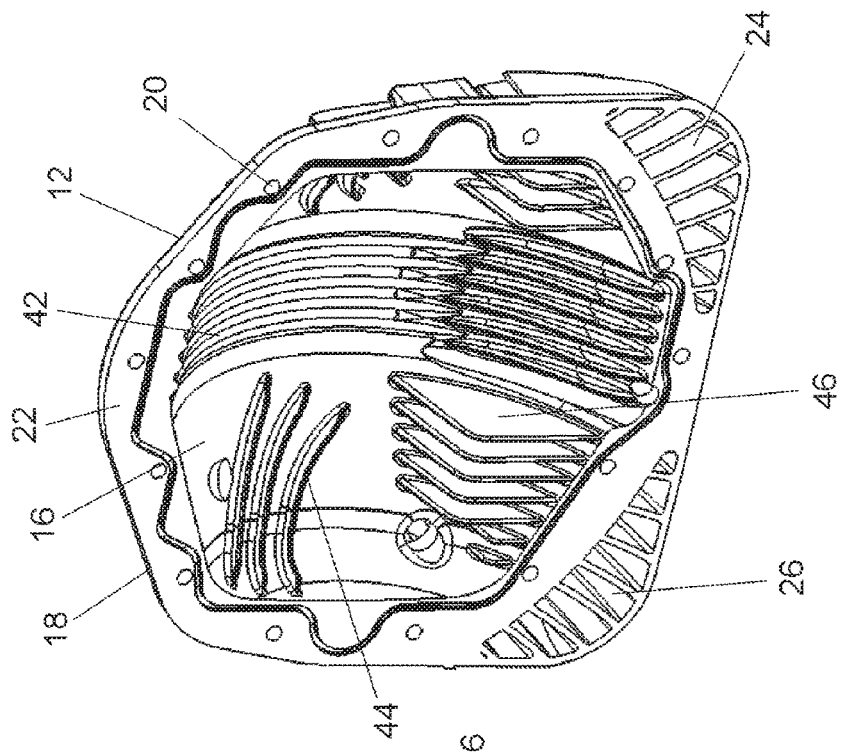
FIG. 10 is an isometric view of the inside of the cover plate with lubricant heat transfer fins.
Figure 9:
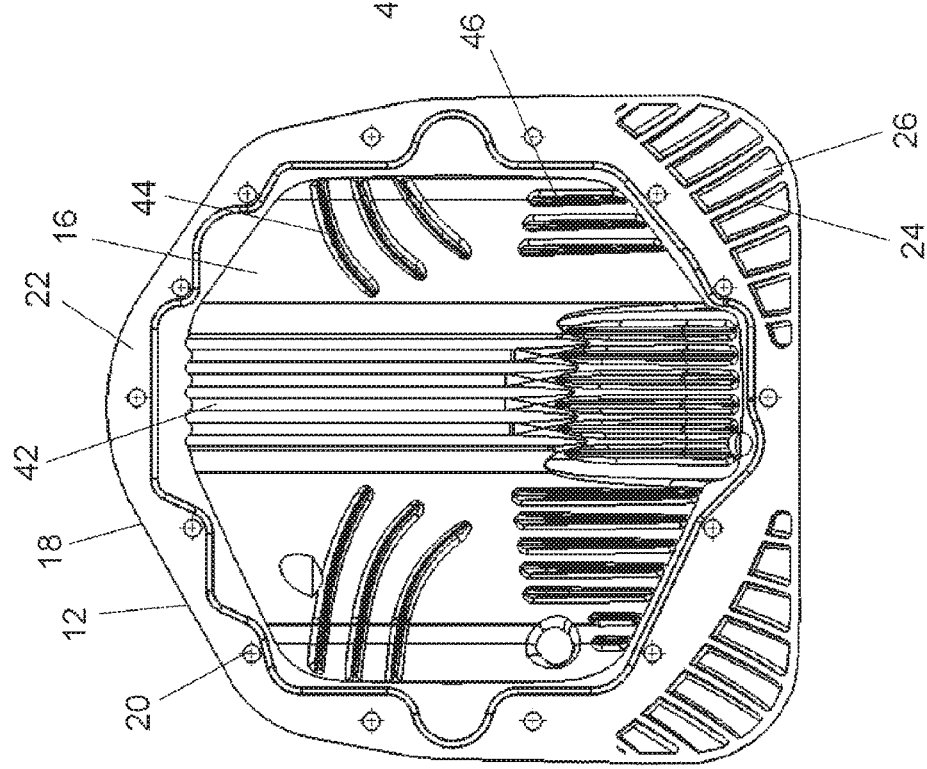
FIG. 9 is a plan view of the inside of a second cover plate with lubricant heat transfer fins.

FIG. 4 also shows flow control fins 42 on the inside of the cover 12. The periphery of the ring gear of the differential mechanism 14 rotates near and parallel to the flow control fins 42 of the inside of the cover 12, which are also parallel to the symmetrical centerline of the cover 12. This arrangement is understood to direct differential lubricant flow over the top of the case to forwardly of the differential mechanism 14 toward the pinion shaft bearings. Conventional lateral fins 44 direct lubricant to differential mechanism carrier bearings and the axle tubes. Heat transfer fins 46 are shown in FIGS. 9 and 10 on the inside of the cover 12 where the cover 12 closes the sump for the differential lubricant.

Accordingly, an improved vehicle differential cover has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A vehicle differential cover for a differential having a differential lubricant sump, comprising
   a cover plate;
   a mounting periphery about the cover plate attachable to the differential at a first side of the cover plate, the cover plate including an area closing the differential lubricant sump;
   cooling fins on a second side of the cover plate, the cooling fins extending over the cover plate area closing the differential lubricant sump;
   at least one air scoop including an upstream edge, a downstream edge and a curved surface therebetween, the curved surface being outwardly of the mounting periphery at the upstream edge and extending to inwardly at the downstream edge, the curved surface being displaced from the second side of the cover plate, the curved surface at the downstream edge directing flow to the cooling fins extending over the area of the cover plate closing the differential lubricant sump.

2. The vehicle differential cover of claim 1, at least some of the cooling fins extending outwardly of the mounting periphery and within the at least one air scoop.

3. The vehicle differential cover of claim 1, the at least one air scoop being two air scoops positioned laterally of the mounting periphery.

4. The vehicle differential cover of claim 1 further comprising
   a baffle pivotally mounted relative to the differential cover to selectively extend from the at least one air scoop to the mounting periphery of the cover plate to block flow through the at least one air scoop.

5. The vehicle differential cover of claim 4 further comprising
   a baffle control system including a controller, a sensor and an actuator, the sensor measuring at least one of ambient air temperature outwardly of the differential cover and differential lubricant temperature, the actuator being engaged with the pivotally mounted baffle, the controller driving the actuator responsive to the measured temperature of the sensor.

6. The vehicle differential cover of claim 5, the controller being a binary thermostat.

7. The vehicle differential cover of claim 1, the cover plate further including a symmetrical centerline and flow control fins on the first side of the cover plate extending parallel to the symmetrical centerline of the cover plate.

8. The vehicle differential cover of claim 1 further comprising
   lubricant heat transfer fins on the first side of the cover plate in the area closing the differential lubricant sump.

9. A vehicle differential cover for a differential having a differential lubricant sump, comprising
   a cover plate;
   a mounting periphery about the cover plate attachable to the differential at a first side of the cover plate, the cover plate including an area closing the differential lubricant sump;

cooling fins on a second side of the cover plate, the cooling fins extending over the cover plate area closing the differential lubricant sump;

at least one air scoop including an upstream edge, a downstream edge and a curved surface therebetween, the curved surface being outwardly of the mounting periphery at the upstream edge and extending to inwardly at the downstream edge, the curved surface being displaced from the second side of the cover plate, the curved surface at the downstream edge directing flow to the cooling fins extending over the area of the cover plate closing the differential lubricant sump, at least some of the cooling fins extending outwardly of the mounting periphery and within the at least one air scoop.

10. The vehicle differential cover of claim 9 further comprising a baffle pivotally mounted relative to the differential cover to selectively extend from the at least one air scoop to the mounting periphery of the cover plate to block flow through the at least one air scoop.

11. The vehicle differential cover of claim 10 further comprising a baffle control system including a controller, a sensor and an actuator, the sensor measuring at least one of ambient air temperature outwardly of the differential cover and differential lubricant temperature, the actuator being engaged with the pivotally mounted baffle, the controller driving the actuator responsive to the measured temperature of the sensor.

12. The vehicle differential cover of claim 11, the controller being a binary thermostat.

13. The vehicle differential cover of claim 9, the cover plate further including a symmetrical centerline and flow control fins on the first side of the cover plate extending parallel to the symmetrical centerline of the cover plate.

14. The vehicle differential cover of claim 9 further comprising lubricant heat transfer fins on the first side of the cover plate in the area closing the differential lubricant sump.

* * * * *